Jan. 22, 1963    G. DE PIOLENC ETAL    3,074,470
LIQUID FUEL BURNER FOR FORMING GLASS FIBERS
Original Filed April 10, 1952
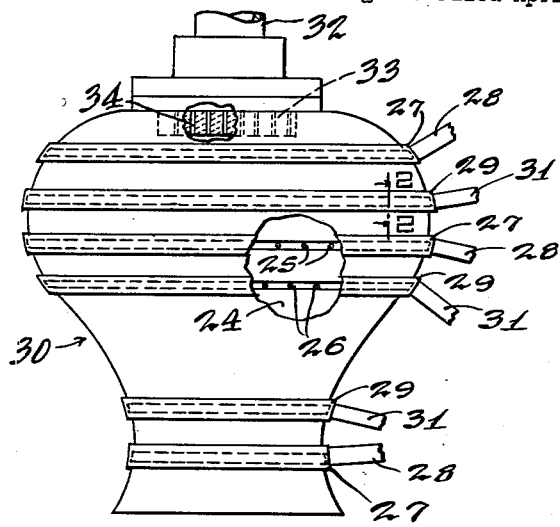
FIG-1-
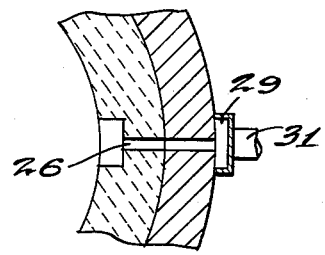
FIG-2-
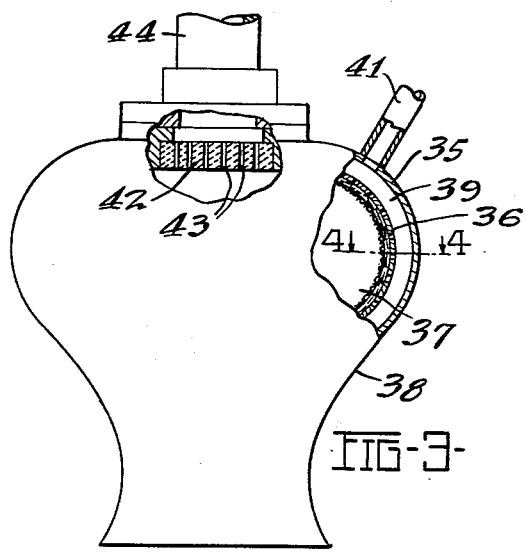
FIG-3-
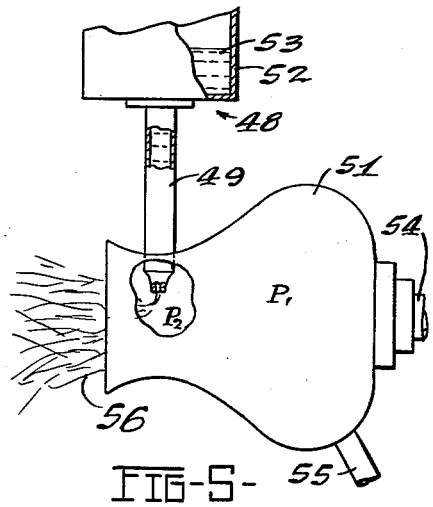
FIG-5-
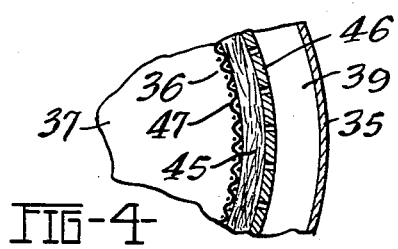
FIG-4-
INVENTORS:
GERARD DE PIOLENC,
BY CHARLES J. STALEGO.
ATTYS.

United States Patent Office 3,074,470
Patented Jan. 22, 1963

3,074,470
LIQUID FUEL BURNER FOR FORMING GLASS FIBERS
Gerard de Piolenc, Granville, and Charles J. Stalego, Newark, Ohio, assignors to Owens-Corning Fiberglas Corporation, Toledo, Ohio, a corporation of Delaware
Original application Apr. 10, 1952, Ser. No. 281,633, now Patent No. 2,841,213, dated July 1, 1958. Divided and this application Mar. 21, 1957, Ser. No. 649,272
1 Claim. (Cl. 158—28)

This invention relates to apparatus for producing fibers from thermoplastic materials and particularly to such apparatus for producing fibrous glass products. This is a division of an application filed April 10, 1952, now U.S. Patent 2,841,213.

In the past, such fibers as mineral wool and glass fibers have been formed by introducing a stream of molten material into a blast of air or steam or combustion products issuing from a nozzle of a suitable burner or blower. The stream of molten material such as glass is attenuated by the force of the blast into fibers having a rather small diameter.

In producing fibrous glass by the attenuation of a molten glass stream with a blast of combustion products from a burner, it has been evidenced that the diameter of the fibrous product varies inversely with the temperature of the molten glass, i.e. the diameter of the fiber becomes smaller when the temperature of the molten glass is increased. When, in an attempt to get very fine diameters, the temperature of the melt is increased quite drastically, it has been found that the stream of glass formed from the molten bath is very difficult to attenuate with any degree of control. When the temperature of the melt becomes too high, the glass has such a low viscosity that it can scarcely be handled by conventional bushings. These bushings are devices having very small orifices which form the stream or streams of molten glass from a molten bath which streams are then introduced into the blast of the burner. When the glass composition is maintained at a very high temperature, the glass simply tends to run through the bushing, and the streams formed are watery and tend to run together and become very difficult to control.

In order to achieve the best properties in the fibrous material, including such properties as tensile strength, uniform fiber diameter and others, it has been found desirable to maintain the temperature of the melt considerably below that temperature at which control of the molten streams of glass is lost. As a result of these limitations affecting the melt temperature, it has been found necessary to vary the velocity and/or the temperature of the attenuating blast in order to vary the fiber diameter as desired.

It is an object of this invention to produce fibers from thermoplastic material such as glass, which fibers have a very fine fiber diameter.

It is also an object of the invention to provide a burner which is adapted for burning fuels which produce very high temperatures and resultant high velocity blasts.

It is an object to produce a burner to which the fuel and oxidizing agent may be introduced independently one of the other, all mixing taking place within the burner.

It is an object to provide a burner having an internal construction within which very high-temperature combustion may take place.

It is an object to provide a burner which is little affected by high-temperature combustion products.

A further object is to provide a burner construction suitable for the separate interjection of liquid and/or gaseous fuels and oxidizing agent into the combustion chamber thereof.

Other objects will be apparent from the description which follows.

In the drawings:

FIGURE 1 is a view of a burner having a combustion chamber particularly adapted for burning gaseous fuels, a part of the combustion chamber wall being broken away;

FIGURE 2 is a partial cross-sectional view along line 2—2 of FIGURE 1;

FIGURE 3 is a view of another embodiment of the invention, a portion of the burner wall being broken away to expose the chamber wall construction;

FIGURE 4 is a sectional view on line 4—4 of FIGURE 3; and

FIGURE 5 is a view of a convergent-divergent venturi burner with molten glass being introduced at the throat thereof.

Several embodiments of the invention have been shown in the drawings and will be described hereafter; however, all of the burners which make up the various embodiments of the invention provide means for introducing a fuel into the combustion chamber in such a manner as to produce very high temperature blasts, while at the same time the surface of the combustion chamber is maintained at a temperature considerably below that of the combustion products.

An embodiment of the invention showing a burner 30 having a convergent-divergent venturi design appears in FIGURES 1 and 2. In FIGURE 1 the combustion chamber 24 of burner 30 is shown provided with ports 25—25 and ports 26—26. Ports 25—25 connect the combustion chamber 24 with a manifold 27, which is one of a series of manifolds that entirely surround the combustion chamber and connect the ports 25—25 with fuel inlet pipes 28—28. Ports 26—26 connect the combustion chamber 24 with manifold 29 which is one of a series of manifolds that extend around the periphery of the combustion chamber 24 and connect ports 26—26 with water inlet pipes 31—31. An inlet 32 for oxidizing materials such as oxygen and especially liquid oxygen leads through the screen 33 which forms the rear of the combustion chamber 24. The screen 33 is a refractory block having a plurality of small passages 34—34.

In operating this burner, liquid oxygen under pressure is admitted to the combustion chamber 24 through inlet 32. A suitable fuel such as natural gas is admitted through inlet pipes 28 and water is directed into inlet pipes 31. After the liquid oxygen vaporizes and mixes with the natural gas, the mixture comprising the natural gas and oxygen vapors burns. The liquid oxygen coming through the screen 33 expands and vaporizes immediately upon being released in the combustion chamber. The oxygen and gas mix intimately and combustion takes place throughout the combustion chamber 24 of the burner 30. Water, which is admitted through water inlet pipes 31—31 covers the inner surface of the combustion chamber wall in the form of a thin film. The water film on the surface of the combustion chamber wall vaporizes and helps control the temperatures which are produced on the wall of the burner combustion chamber. The ports for admitting natural gas and water are shown arranged in alternate rows which are disposed both in the large portion of the combustion chamber and in the constricted portion near the nozzle end of the combustion chamber. By proper placement of the fuel ports 25—25 and water ports 26—26, it is possible to control the surface temperature within the combustion chamber 24. The water admitted through ports 26—26 has a great effect upon the temperatures which are produced on the inner surface of the combustion chamber wall. By controlling the amount of water introduced by this means, it is possible to control the wall temperature as desired.

If so desired, alcohol or another suitable fuel instead of natural gas may be introduced through ports 25—25 while water is introduced through ports 26—26. The preferred method is to introduce the water and alcohol through separate groups of ports since the chamber wall temperature can be controlled by varying the amount of water being introduced; however as another alternative, aqueous solutions of alcohol can be introduced through both ports 25—25 and 26—26.

In FIGURE 3 and improved burner construction is shown. This burner 38 comprises an outer shell 35 and an inner wall 36 which define a double walled combustion chamber 37. The inner wall 36 and outer shell 35 define a fuel chamber 39. A solution of alcohol is introduced into fuel chamber 39 through inlet 41. The rear wall of the combustion chamber 37 is a refractory block 42 which has a plurality of passages 43—43. An inlet 44 directs liquid oxygen from the supply source into the passages 43—43 and then into the combustion chamber 37. The inner wall 36 comprises a perforated sheet metal layer 46 which is disposed on that side of the inner wall which is nearest the outer shell. Next to the perforated sheet metal layer 46 is a layer of bulk leached glass fibers 45 which is retained against the perforated sheet metal by a layer of wire mesh 47. The wire mesh may be a screen of such a material as Inconel or other oxidation resisting material. The fiber retained betwen the wire mesh 47 and the perforated sheet metal layer 46 may be any suitable siliceous fibrous material, including silica fiber and aluminum silicate fiber.

During the operation of this burner the alcohol solution seeps through the inner wall 36 and thereupon vaporizes from a film of fuel which forms upon the surface of the inner wall 36. Because of the cooling effect produced by the vaporization of the fuel from this film on the inner wall, the flame does not touch the relatively cool inner wall. Stated in another manner, there is always a temperature gradient between the temperature of the wall and the temperature of cumbustion. The liquid introduced through inlet 44 and refractory block 42 vaporizes upon being released in the combustion chamber 37 and thorough mixing of the oxygen and alcohol vapors takes place. These vapor mixtures then burn to produce a very high-velocity blast.

In FIGURE 5 a convergent-divergent venturi burner 51 is shown with a means 48 for introducing a molten stream of glass into the burner throat. The glass feeding means 48 comprises a tube 49 which connects melting tank 52 filled with molten glass 53 with the throat of the burner 51. The burner 51 is one such as that shown in FIGURE 3 and comprises oxygen inlet 54 and liquid fuel inlet 55.

When operating this burner, liquid oxygen under pressure is introduced through inlet 54 and alcohol is introduced under pressure through inlet 55. The liquid oxygen and a alcohol vaporize and the vapors mix and then burn resulting in a high pressure $P_1$ being formed in the combustion chamber of the burner 51. The oxygen and alcohol are introduced into the combustion chamber under a pressure higher than $P_1$. Likewise the head of molten glass 53 in tube 49 and melting tank 52 provides glass under a pressure which is greater than $P_2$, the pressure of the gases within the throat of the burner 51.

The high-velocity blast of gases passing through the throat of the burner past the end of tube 49 attenuates the stream of molten glass into a myriad of fibers 56 which are exhausted from the burner along with the products of combustion which form the high-velocity blast.

A plurality of tubes may be used instead of the single tube 49 if so desired.

By using burners of this invention, it is possible to greatly increase the fiber production rate since much higher velocities of the combustion gases are achieved by the use of the burners herein described. Formerly the production rate of fibers was fixed at some value based upon the maximum velocity of the burners used. The very maximum velocity formerly was the sonic velocity which was not attained by use of conventional burners. By using the burners of this invention, it is possible to attain velocities above the sonic range which results in greatly increased fiber production. Velocities have been increased as much as ten times over that produced by the conventional burners which burned natural gas and air mixtures.

In the burner shown in FIGURE 1, which burner may use natural gas, geratly increased blast velocities and temperatures have ben achieved. Natural gas is not generally introduced into fiber-forming burners at high pressures such as those used in this invention. Natural gas and air when mixed prior to introduction into the burner form explosive mixtures. The Underwriter Laboratories will not approve any setup wherein the explosion pressure of the mixture is greater than the bursting pressure of the pipes. For this reason fuel pressures within a fuel line cannot be elevated appreciably when gas and air mixtures are used. The burners of this invention introduce the fuel and oxidizing agent separately into the combustion chamber; therefore, the fuel may be introduced at pressures up to 35 pounds per square inch and higher. By elevating the inlet pressure of the fuel it is possible to increase the rate of feed of fuel and the temperature and velocity of the combustion products.

In developing these higher velocities, it has been necessary to raise the temperature of the blast as much as 500° F. over that of the blasts formerly used to attenuate fibers. Only by using the cooling technique derived from forming a film of fuel upon the combustion chamber wall is it possible to increase flame temperatures along with velocities of the resultant blasts. When chamber temperatures of 3000° F. or higher are produced in the burners of this invention, chamber wall temperatures of 2000° F. can be attained.

Other fuels than those listed may be used including such fuels as natural gas, liquid hydrogen, alcohols including methyl, ethyl, propyl, butyl and others, gasolene, kerosene or suitable mixtures of one or more of these fuels. The oxidizing agent may be liquid or gaseous oxygen or air or hydrogen peroxide, fuming nitric acid or the like.

Chamber temperatures from 3000° F. to about 5400° F. or higher may be produced by the burners of this invention using the fuels indicated. Gas velocities from the nozzle may reach velocities of from 4000 to 5000 feet per second or higher.

Although specific embodiments of the invention have been disclosed in detail, it is not intended that the invention be limited thereto but rather is to include any obvious modifications and variations as defined by the following claim.

We claim:

Apparatus for producing fibrous glass comprising a burner assembly having a combustion chamber comprising a metallic shell and within and coextensive with said shell a lining disposed in a spaced-apart relationship with said metallic shell to form a fuel chamber therebetween, said lining comprising an inner wire mesh layer, an outer perforated metallic sheet and a layer of siliceous fibrous material therebetween, said combustion chamber having a convergent-divergent restricted outlet passageway for exhausting gaseous products of combustion in the form of a high-velocity blast and inlet means opposite said outlet passageway for introduction of an oxidizing agent into said combustion chamber, and means for introducing liquid fuel under pressure into said fuel chamber to force the fuel into said combustion chamber through said lining substantially throughout its extent to provide a high velocity blast and to reduce the temperature of the lining.

References Cited in the file of this patent

UNITED STATES PATENTS

| | | |
|---|---|---|
| 1,151,311 | Walsh | Aug. 24, 1915 |
| 1,213,470 | Finlay | Jan. 3, 1917 |
| 1,238,011 | Ellis | Aug. 21, 1917 |
| 1,419,380 | Hoffman | June 13, 1922 |
| 1,495,164 | Coberly | May 23, 1924 |
| 2,183,313 | Goddard | Dec. 12, 1939 |
| 2,425,630 | McCollum | Aug. 12, 1947 |
| 2,551,114 | Goddard | May 1, 1951 |
| 2,554,486 | Austin | May 29, 1951 |
| 2,563,028 | Goddard | Aug. 7, 1951 |
| 2,578,100 | Stalego | Dec. 11, 1951 |
| 2,712,351 | Roth | July 5, 1955 |
| 2,725,929 | Massier | Dec. 6, 1955 |

FOREIGN PATENTS

| | | |
|---|---|---|
| 538,298 | France | Mar. 16, 1922 |
| 574,871 | Great Britain | Jan. 24, 1946 |